(12) United States Patent
Lion

(10) Patent No.: US 6,224,707 B1
(45) Date of Patent: May 1, 2001

(54) METHOD FOR THE PRODUCTION AND MULTICOLOR PRINTING OF THERMO-ADHESIVE FLOCKED FILMS

(75) Inventor: Jean-Pierre Lion, Laval (FR)

(73) Assignee: Societe d'Enduction et de Flockage, Laval (FR)

( * ) Notice: Subject to any disclaimer, the term of this patent is extended or adjusted under 35 U.S.C. 154(b) by 0 days.

(21) Appl. No.: 09/172,910

(22) Filed: Oct. 15, 1998

(30) Foreign Application Priority Data

Oct. 15, 1997 (FR) .................................................. 97 12921

(51) Int. Cl.⁷ .............................. B44C 1/165; B32B 5/22; B05D 1/14; B05D 1/16; D06P 5/28
(52) U.S. Cl. .......................... 156/230; 156/62.2; 156/72; 156/240; 156/241; 156/247; 156/289; 156/244.19; 427/146; 427/147; 427/148; 427/200; 427/206; 427/208.02; 428/90; 428/914; 8/471; 8/478
(58) Field of Search ........................... 156/62.2, 72, 230, 156/235, 240, 241, 247, 277, 289, 244.18, 244.19, 250; 427/146, 147, 148, 200, 206, 208.2; 428/90, 97, 914; 8/471, 478

(56) References Cited

U.S. PATENT DOCUMENTS

| | | | |
|---|---|---|---|
| 3,922,410 | * 11/1975 | Halloran | 428/88 |
| 3,956,552 | * 5/1976 | Geary | 428/88 |
| 4,294,577 | 10/1981 | Bernard . | |
| 4,741,791 | 5/1988 | Howard et al. . | |
| 5,047,103 | * 9/1991 | Abrams et al. | 156/72 |
| 5,534,100 | * 7/1996 | Mitchell | 156/230 |
| 5,537,135 | * 7/1996 | Hevenor et al. | 347/171 |
| 5,734,396 | * 3/1998 | Hale et al. | 347/54 |
| 5,981,021 | * 11/1999 | McCulloch | 428/97 |

FOREIGN PATENT DOCUMENTS

| | | |
|---|---|---|
| 0 581 614 | 2/1994 | (EP) . |
| 2 343 609 | 10/1977 | (FR) . |
| 2 066 158 | 7/1981 | (GB) . |

* cited by examiner

Primary Examiner—Richard Crispino
Assistant Examiner—J. A. Lorengo
(74) Attorney, Agent, or Firm—Young & Thompson

(57) ABSTRACT

The method consists in applying a thermoadhesive or HF-weldable film (2) on a temporary protection paper (1), applying an adhesive layer 2a) on said film, flocking fibers (F) on this adhesive layer, preparing a pre-printed paper with multicolor designs constituted by sublimable dyes and transferring by sublimation the multicolor-designs from the pre-printed paper onto the flock-fibers by close contact between the two elements under a predetermined pressure and temperature.

19 Claims, 1 Drawing Sheet

METHOD FOR THE PRODUCTION AND MULTICOLOR PRINTING OF THERMO-ADHESIVE FLOCKED FILMS

FIELD OF THE INVENTION

The present invention relates to an automatic, continuous method for printing multicolor-designs on a thermoadhesive or high-frequency (HF) weldable flocked film or substrate, to the film obtained by this printing method, as well to a method of application of this film onto a substrate to be decorated, such as a fabric, and consequently to the substrate printed according to this method.

BACKGROUND OF THE INVENTION

Printing by transfer-sublimation, i. e. by means of sublimable dyes, is already known, and it can be described as the printing, in a first step, of designs on a paper substrate by using inks constituted by sublimable dyes, capable of vaporizing when reaching a certain temperature and of fixing themselves permanently on certain synthetic fibers, whereas different methods can be used for printing the paper substrate, for instance offset, flexography- or heliography-printing, or flat-bed or rotary screen-printing. Then, in a second step, the pre-printed designs of sublimable dyes—as applied on the paper substrate—are transferred by contact under predetermined pressure and temperature between the printed paper and the fabric to be decorated.

This method of transfer-sublimation is currently used for printing on synthetic fabrics as well as on the surface of flocked fabrics which are commonly used for upholstery or automobile decoration.

However, this method has never been used for the printing of thermoadhesive or high-frequency-weldable flocked films, because the thermal sensitivity of such films makes it very difficult to print by transfer-sublimation, as this operation must be carried out at a minimum temperature of 180° C. (350° F.), which is a temperature that those films are unable to stand.

Furthermore, thermoadhesive or high-frequency-weldable films are commonly flocked with fibers made of rayon-viscose, which fibers cannot be printed satisfactorily by the existing method of transfer-sublimation.

Thermoadhesive or weldable flocked films are commonly used for the decoration of garments, fabric products and accessories, and more generally of all substrates suitable for decoration by means of heat-application or high-frequency (HF) welding.

Those thermoadhesive or weldable films are usually flocked with fibers which are dyed before flocking, which leads to one-color flocked surfaces in which patterns like numbers, letters or logos are cut out before being applied onto the substrate to be decorated.

For printing multicolored designs on a thermoadhesive or HF-weldable film, usually a screen-printing of a white-colored flocked film is carried out. Generally, white flock-fibers made of rayon-viscose are used. The thermoadhesive or HF-weldable flocked film which is screen-printed in this way with multicolor-designs is usually pre-cut before heat application in case of a thermoadhesive film, and cut out during application in case of HF-welding.

However, this screen-printing method presents some drawbacks, in particular a low washing fastness of the printed colors which are losing their brightness after several washings of the decorated substrate, as well as a low abrasion resistance of the rayon-viscose flock-fibers, mostly when being wet. Also the screen-printing of the flock-layer requires the deposit of an important amount of printing-ink in order to cover the full length of the fibers, which in its turn also requires the use of screens with open mesh, limiting therefore the accuracy of the printing and making impossible the reproduction in four colors and halftones, like for instance photographic works.

In order to obtain a HF-weldable multicolor flocked-film, the use of another method is known where different pre-died nylon flock-fibers are applied by "multicolor-flocking", color by color, each fiber/color going through separate screens and being fixed onto a HF-weldable film, each screen being made according the position of each color in the final multicolor design to be printed on the film. However, this method requires the use of one separate screen for each printed color, and for each printed design, which makes this production of flocked sheets slow and technically difficult, and consequently expensive.

SUMMARY OF THE INVENTION

The present invention tends to remedy all above listed drawbacks by a new fully-automatic method of continuous printing of multicolor designs onto a thermoadhesive or HF-weldable film, allowing the reproduction of the finest possible details, including reproduction of four color and halftone photographic artworks, the final printing of the flock-fibers being of high washing-fastness and high abrasion-resistance.

In this purpose, the object of the present invention is a method for automatic continuous printing of multicolor designs on a thermoadhesive or HF-weldable flocked film, characterized by the fact that it comprises the steps consisting in:

applying an thermoadhesive or HF-weldable film onto a strippable protection paper.

applying an adhesive layer onto said film, flocking white colored fibers or flocks onto the adhesive layer, preparing a pre-printed paper with multicolor-designs constituted by sublimable color agents able to vaporize and fix themselves permanently on the said fibers, those pre-printed designs being exactly a reverse image of the designs to obtain on the flocked film, transferring the multicolor-designs by sublimation from said pre-printed paper onto a laminate made of the protection paper and of the flocked film by contact under selected pressure and temperature.

The use of this strippable protection paper allows continuous printing of the thermoadhesive or HF-weldable flocked film without modifying this film's integrity and cohesion.

In a first embodiment, the temporary protection paper is coated or covered by co-extrusion with a film of synthetic polymers which are HF-weldable, such polymers being for instance resins of poly-vinyl-chloride (PVC), which can be used under compact form or foamed by use of chemical or mechanical swelling agents.

In a second embodiment, the temporary protection paper is coated or covered by co-extrusion with a film of synthetic resins which are thermoadhesive, such as hot-melt resins made with co-polyesters, co-polyamides, or resins of acrylic-esters, synthetic latexes, ethylene-vinylacetate (EVA), etc.

The fibers used for the flocking operation will advantageously be synthetic fibers, preferably fibers made from polyamide, such as nylon 6 or nylon 6—6 (trademark from DU-PONT DE NEMOURS), or even more preferably fibers made from polyester. For instance, fibers used will be fibers going from 0.5 mm (0.9 Dtex) to 2 mm (6 Dtex) or even longer.

Those fibers can also be either man-made-fibers, such as rayon-viscose, either natural fibers, such as cotton, which will be previously treated in order to be able to fix the sublimable dyes.

According to another characteristic, the transfer operation is made by means of a heat-printing calender, ensuring a uniform pressure generally lower than 40 kPa, between the pre-printed paper and the laminate, and a temperature comprised between about 180° C. (350° F.) and 230° C. (450° F.), during approximately 5 to 45 seconds.

Advantageously, the pre-printed paper is produced by printing the sublimable dyes onto the paper by means of an ink-jet printer, assisted by a computer system.

This is an important part of the present invention, as a direct printing of a flocked film is made very difficult with an ink-jet printer, the reason being the small amount of ink sprayed by such ink-jet printers which are unable to cover and fill totally the flock-layer in one run.

According to the present invention, the sublimable dyes are printed onto the paper by the ink-jet printer in one pass, which allows high-quality printing of any type of designs, including four color and halftone jobs, the use of an ink-jet printer with computer assistance being free of any printing tools, such as screens, engraved cylinders or plates.

An other object of the present invention is a flocked film, thermoadhesive or HF-weldable, obtained directly by the method as described here above, which comprises a strippable protection paper onto which a thermoadhesive or HF-weldable film is applied, said film being covered by an adhesive layer on which fibers or flocks printed with multicolored designs are sticking close.

An other object of the present invention is a method for the application of the above mentioned flocked film onto a substrate to be decorated, such as a fabric or any other substrate such as paper, cardboard, unwoven web or a plastic film, in which pre-selected designs to be applied onto the substrate are localized, those designs are then cut out on the film according to this localization, and the temporary protection paper is stripped off before application onto the substrate to be decorated, by means of heat-sealing or HF-welding, of the selected portion of the film which has been accordingly cut out and stripped off.

As a variant the method comprises the step, before localization of the printed designs, consisting in laminating the printed flock-fibers of the flocked film together with a temperature resistant substrate, which is slightly self-adhesive and which can resist to a temperature of 180° C. (350° F.), then cut out the film from its unflocked surface without cutting out the self-adhesive substrate, then strip off from the self-adhesive substrate the portion of the flocked film which does not correspond to the preselected designs, then the selected portions are indirectly applied onto the substrate to be decorated via the self-adhesive substrate and, finally, lift off the temporary substrate from the portions of the film which are thus applied onto the substrate to be decorated, after heat or HF-welding application.

Advantageously, in the case of HF-welding, the method comprises the step consisting in stripping off the temporary protection paper from the flocked film, in localizing the preselected designs on the flocked film, and using the welding tool for simultaneously cut out and HF-weld the thus localized portion of the flocked film on the substrate to be decorated, a layer of foam being possibly inserted between the flocked film and the substrate.

An other object of the present invention is a decorated substrate such as a fabric or any other substrate such as paper, cardboard, unwoven web or a plastic film, directly obtained by the method described here above, which comprises a substrate onto which is heat-mounted or HF-welded the portion of the heat-adhesive or HF-weldable film with the preselected and cut-out printed designs.

BRIEF DESCRIPTION OF THE DRAWINGS

The present invention will be better understood and other aims, details, advantages and characteristics of the invention will appear more clearly from the below detailed description of a, at present, preferred embodiment of the invention, given only as an illustration and not limiting the invention, with reference to the enclosed drawings, on which.

DESCRIPTION OF THE PREFERRED EMBODIMENTS

Figure 7:
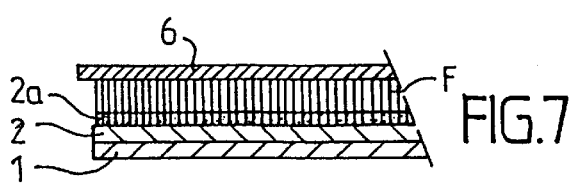
FIG. 7 is a cut view of the laminate shown in FIG. 3, on which a temporary self-adhesive paper has been applied.
Figure 6:
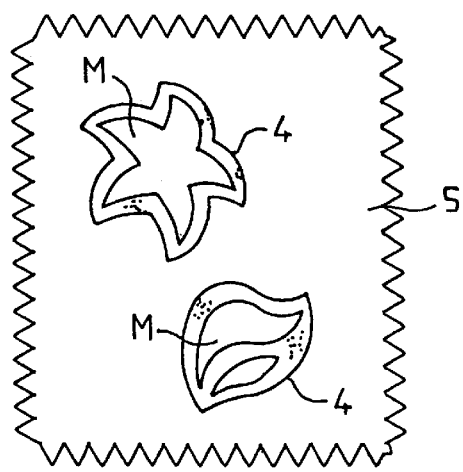
FIG. 6 shows from above a piece of fabric on which the cut and stripped film portions of FIG. 5 have been heat-applied.

According the specific example shown on the enclosed drawings, the printing method described in present invention consists in coating firstly a base layer of a plastic material 2 forming a thermoadhesive or HF-weldable film on one side of a strippable protection paper sheet 1 (see FIG. 7).

Figure 1:
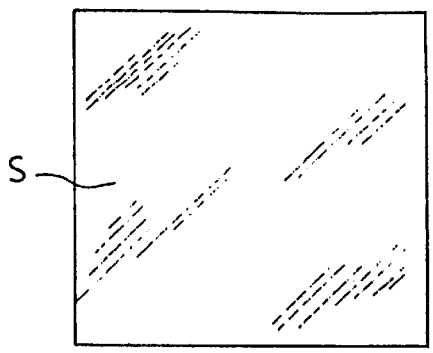
FIG. 1 is a flat view per above of a laminated blank made with a temporary protection paper on which is applied a thermoadhesive film, coated on its upper side with an adhesive retaining white colored flocks.

This film 2 is coated on its opposite side with an adhesive layer 2a on which fibers F, so called <<flocks>>, are flocked. FIG. 1 indicates as S the laminate constituted by temporary protection paper 1, film 2, adhesive layer 2a and flock-fibers F, as seen from the side of the fibers F.

Figure 2:
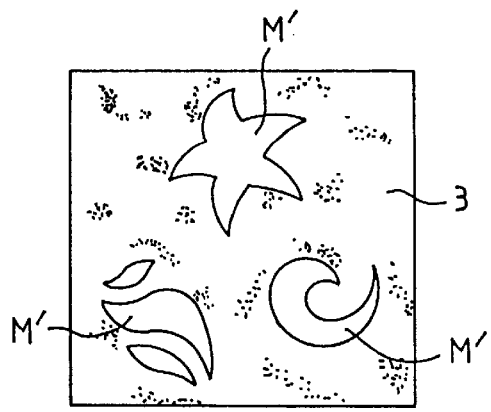
FIG. 2 is a flat view per above of a pre-printed sheet of paper with reversed multicolor-designs.

FIG. 2 shows a paper sheet 3, pre-printed on a paper substrate with multicolor-designs M' of sublimable dyes; pre-printing of the paper may be achieved for instance with an ink-jet printer assisted by computer (not shown in the Figures). This pre-printed paper 3 will be set up on a heat-printing calender (not shown) put in close contact with the flock-fibers F of the laminate S, made with temporary protection paper 1 and with flocked film 2.

Figure 3:
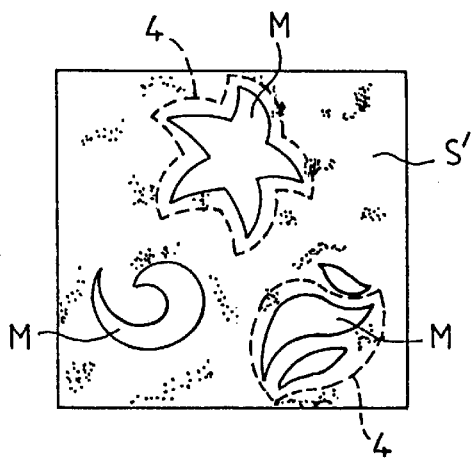
FIG. 3 shows the opposite side of FIG. 2, and corresponds to the laminated blank shown in FIG. 1 after printing by transfer-sublimation of the multicolor designs pre-printed on the paper shown in FIG. 2.
Figure 4:
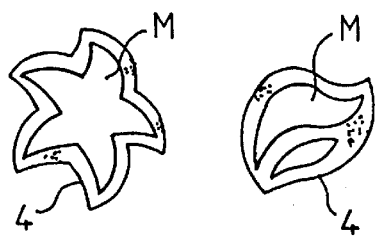
FIG. 4 shows preselected multicolor-designs, cut out from the laminate shown in FIG. 3.

The laminate S is then advanced simultaneously with the rotation of the heat-printing calender under a uniform pressure, usually inferior to 40 kPa, and at a temperature comprised between 180° C. (350° F.) and 230° C. (450° F.), during approximately 5–45 seconds. It is in this way possible to obtain the transfer of the multicolor-designs M' from the pre-printed paper onto the flock-fibers F by vaporization of the sublimable dyes which fix themselves permanently on the fibers of the flocked film. In FIG. 3, the laminate obtained after transfer-sublimation printing has been marked S'. This printing method brings the great advantage of printing the flocked film in a continuous way, the laminate S being unwinded in synchronization with the rotation of the heat-printing calender.

It should be noted that the printed flocked film S', as shown in FIG. 3, offers printed designs M which are exactly the reverse "mirror" image of the designs M' pre-printed on paper 3 as can be seen in FIG. 2. Consequently, designs must always be printed on the paper 3 with the reverse image so as to obtain a design on the fabric to be decorated at this place.

In a first variant of the embodiment, the cutting out of certain selected designs 4, printed on the laminate S' shown in FIG. 3, is made directly in a continuous manner. This cutting operation can be carried out either with a die-cutting continuous machine, either by laser-cutter, either with a water-jet cutting device or with a computer controlled cutting-plotter. In order to make this cutting operation fully automatic, it is necessary to previously exactly localize the designs to cut out 4, as indicated by the dot-line shown on laminate S' in FIG. 3, which can be achieved by means of e. g. an optical localization equipment.

Figure 5:
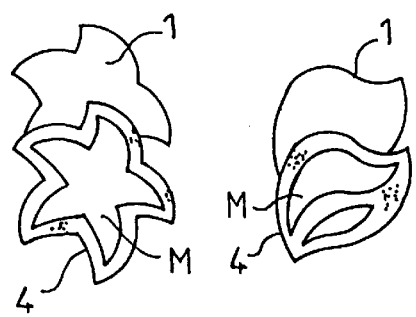
FIG. 5 shows the designs of FIG. 4, after the temporary protection paper has been stripped off.

As shown in FIG. 5, the temporary protection paper 1 is stripped off in order to separate a portion of the printed flocked film 4, corresponding to one or more cut designs M. Of course, the protection paper could in certain cases be stripped off before the cutting operation.

This portion of the printed flocked film 4 is then applied by its unflocked side onto a substrate 5, for instance a garment or a fabric accessory or similar. The application is obtained by means of heat in order to fix the thermoadhesive film onto the fabric, which can be done with an electrically heated calender, a smoothing iron or similar heating equipment.

In an other variant of the embodiment, the flocked surface of the printed flocked film is laminated by means of pressure onto a slightly self-adhesive temporary substrate 6 having a high resistance to temperature as for instance a polyester film coated with special silicon-or acryhc-resins. The protection paper 1 is then stripped off and the flocked printed film is cut from its unflocked side 2 without cutting through the self-adhesive substrate 6 which is stuck on the upper side of the flock-fibers F of the flocked film. Due to the length of the flock-fibers, it is easy to limit the cut only to the flocked film.

In this variant, it is of course also possible to proceed to the cutting of the flocked film after optical localization of the printed designs, by transparency through the base film 2 of the flocked film.

Then the cut portion of the flocked film which is not printed and that must not be applied is stripped away from the self-adhesive substrate 6. This temporary self-adhesive substrate presents the advantage that it maintains exactly the relative positions of the different selected designs 4, without making necessary their re-positioning during their application onto the fabric to be decorated. Actually, those selected and cut printed designs 4 may be applied onto the fabric 5 while being still supported by the self-adhesive substrate 6. During heat application onto the temporary substrate, the heat is indirectly transferred to the flocked film and melts the thermoadhesive part of the flocked film and sticks to the film, without alteration of the self-adhesive substrate which is apt to stand the temperature at thermal adhesion of the film.

After heat application onto the fabric to be decorated, the temporary substrate 6 is simply removed.

In the case of a HF-weldable flocked film, operations of cutting and application may be carried out simultaneously on the fabric to be decorated. A welding-electrode (not shown) is used for this purpose, which is at the same time a welding- and a cutting-tool sending HF-waves able to simultaneously cut out the selected designs on the flocked film and the border of these designs on the fabric to be decorated. It is also possible to insert a layer of PVC-foam between the fabric and the unflocked side of the flocked film. Obviously, the temporary protection paper will have been stripped off before.

This will result in a fabric decorated by a flocked film showing multicolor-printed designs, with a nice feeling and a soft touch. It is therefore more convenient to use flock-fibers with small diameter and a relatively important length.

Although the present invention has been described in connection with specific embodiments, it is obvious that it is not limited to those embodiments and that it also includes all technical equivalents of the described means, as well as their combining, whenever they enter in the field of the invention.

What is claimed is:

1. A method for automatic continuous printing of multi-color designs on a thermoadhesive or HF-weldable flocked film, comprising the steps of:

applying a thermoadhesive or HF-weldable film (2) onto a strippable protection paper (1), applying an adhesive layer (2a) uniformly onto the thermoadhesive or HF-weldable film (2), flocking white colored fibers or flocks (F) uniformly on the adhesive layer (2a), so as to provide a laminate (S) made of said strippable protection paper (1), said thermoadhesive or HF-weldable film (2), said adhesive layer (2a) and said white colored fibers or flocks (F), preparing a pre-printed paper (3) with multicolor-designs (M') constituted by sublimable color agents able to vaporize and fix themselves permanently on said white colored fibers or flocks (F), said multicolor designs (M') being exactly a reverse image of designs (M) to be obtained on the white colored fibers or flocks (F) of said laminate (S), transferring the multicolor-designs (M') by sublimation from said pre-printed paper (3) onto the white colored fibers or flocks (F) of said laminate (S) by putting said pre-printed paper (3) into contact with said laminate (S) under selected pressure and temperature so as to obtain a thermoadhesive or HF-weldable flocked film (S') printed with multicolor designs (M), wherein the strippable protection paper (1) of said laminate (S) allows continuous thermal sublimation transfer printing of the thermoadhesive or HF-weldable flocked film without altering the integrity and cohesion of the thermoadhesive or HF-weldable film during the transfer step.

2. The method as claimed in claim 1, wherein the strippable protection paper (1) is coated or covered by co-extrusion with a film (2) made of HF-weldable synthetic polymer.

3. The method as claimed in claim 1, wherein said strippable protection paper (1) is coated or covered by co-extrusion with a film (2) made of thermoadhesive synthetic resins.

4. The method as claimed in claim 1, wherein said fibers (F) are synthetic fibers, preferably fibers of polyamide.

5. The method as claimed in claim 1, wherein fibers (F) are either man-made fibers or natural fibers previously treated to be able to satisfactorily fix the sublimable dyes.

6. The method as claimed in claim 4, wherein said fibers (F) are fibers of 0.5 mm (0.9 Dtex) to 2 mm (6 Dtex).

7. The method as claimed in claim 1, wherein the transfer step is carried out by means of a heat-printing calender ensuring a uniform pressure, lower than 40 kPa, between the pre-printed paper (3) and the laminate (S), and a temperature between 180° C. (350° F.) and 230° C. (450° F.), applied during 5 to 30 seconds.

8. The method as claimed in claim 1, wherein the pre-printed paper (3) is obtained by deposition of sublimable dyes on said paper by means of an ink-jet printer, controlled by a computer.

9. A method of applying onto a substrate (5) to be decorated a thermoadhesive or HF-weldable flocked film (S') printed with multicolor designs (M), obtained by the method of claim 1, comprising the further steps of:

localizing on the thermoadhesive or HF-weldable flocked film (S') one or several preselected printed designs (4) to be applied onto the substrate (A) to be decorated among said multicolor designs (M), cutting the thermoadhesive or HF-weldable flocked film along edges of the localized preselected printed designs (4), so as to obtain selected cut-out portions of said thermoadhesive or HF-weldable flocked film bearing respectively said preselected printed designs (4), stripping off the protection paper (1) from said selected cut-out portions of the thermoadhesive or HF-weldable flocked film; and applying by heat-sealing or HF-welding the selected cut-out and stripped-off portions of the thermoadhesive or HF-weldable flocked film onto the substrate to be decorated.

10. The method as claimed in claim 9, comprising the further steps of:

before the localization step, applying a temporary substrate (6) being slightly self-adhesive and having a high temperature resistant onto the fibers or flocks (F) of said thermoadhesive or HF-weldable flocked film (S'), then performing the cutting step without cutting the temporary substrate (6), removing from the temporary substrate (6) cut-out portions of the thermoadhesive or HF-weldable flocked film which do not correspond with the pre-selected printed designs (4), applying, indirectly, said selected cut-out and stripped-off portions onto the substrate to be decorated by means of the temporary substrate (6), and heat-sealing of HF-welding said selected cut-out and stripped-off portions to the substrate to be decorated, and finally, stripping off the temporary substrate (6) from the selected cut-out and stripped-off portions fixed by heat-sealing or HF-welding onto the substrate to be decorated.

11. A method of applying onto a substrate (5) to be decorated a HF-weldable flocked film (S') printed with multicolor designs (M), obtained by the method of claim 1, comprising the steps of:

stripping off the protection paper (1) from said HF-weldable flocked film, localizing on said HF-weldable flocked film at least one selected portion of said HF-weldable flocked film bearing pre-selected printed designs (4) to be applied to the substrate (5) to be decorated, carrying out simultaneously, with a welding-tool (electrode), cutting and HF-welding operations for fixing said selected portion of said HF-weldable flocked film to the substrate to be decorated.

12. The method of claim 11, comprising the further steps of inserting a layer of foam between an unflocked side of said HF-weldable flocked film and the substrate to be decorated prior to said cutting and HF-welding operations.

13. The method as claimed in claim 2, wherein said HF-weldable synthetic polymer is a resin of polyvinylchloride (PVC), compact of foamed by use of mechanical or chemical agents.

14. The method as claimed in claim 3, wherein said thermoadhesive synthetic resins are thermoadhesive resins based on co-polyamides or co-polyesters or acrylic-esters, synthetic latexes, or ethyle-vinyl-acetate.

15. The method as claimed in claim 4, wherein said synthetic fibers are fibers of polyamide or fibers of polyester.

16. The method as claimed in claim 5, wherein said man-made fibers are fibers of rayon-viscose.

17. The method as claimed in claim 5, wherein said natural fibers are cotton fibers.

18. The method as claimed in claim 9, wherein said substrate to be decorated is selected in the group comprising a fabric, a paper, a cardboard, an unwoven web and a plastic film.

19. The method as claimed in claim 11, wherein said substrate to be decorated is selected in the group comprising a fabric, a paper, a cardboard, an unwoven web and a plastic film.

* * * * *